United States Patent
Statham

(10) Patent No.: US 10,018,737 B2
(45) Date of Patent: Jul. 10, 2018

(54) METHOD OF PROCESSING A PARTICLE SPECTRUM

(71) Applicant: Oxford Instruments Nanotechnology Tools Limited, Oxon (GB)

(72) Inventor: Peter Statham, Oxon (GB)

(73) Assignee: OXFORD INSTRUMENTS NANOTECHNOLOGY TOOLS LIMITED, Oxon (GB)

(*) Notice: Subject to any disclaimer, the term of this patent is extended or adjusted under 35 U.S.C. 154(b) by 426 days.

(21) Appl. No.: 14/893,578

(22) PCT Filed: May 21, 2014

(86) PCT No.: PCT/GB2014/051555
§ 371 (c)(1),
(2) Date: Nov. 24, 2015

(87) PCT Pub. No.: WO2014/188186
PCT Pub. Date: Nov. 27, 2014

(65) Prior Publication Data
US 2016/0116615 A1 Apr. 28, 2016

(30) Foreign Application Priority Data
May 24, 2013 (GB) .................................. 1309417.2

(51) Int. Cl.
*G01T 1/36* (2006.01)
*G01T 1/17* (2006.01)
(52) U.S. Cl.
CPC ............... *G01T 1/36* (2013.01); *G01T 1/171* (2013.01)
(58) Field of Classification Search
CPC ..................................... G01T 1/36; G01T 1/17
See application file for complete search history.

(56) References Cited

U.S. PATENT DOCUMENTS

2002/0121603 A1* 9/2002 Wong .................... G01T 1/1642
250/363.09
2008/0031540 A1* 2/2008 Harding ................ G06T 11/008
382/275

(Continued)

FOREIGN PATENT DOCUMENTS

JP 2012013563 A 1/2012
WO WO 2012/110754 A1 8/2012

OTHER PUBLICATIONS

IEEE Nuclear Science Symposium and Medical Imaging Conference (1992), vol. 39, Bristow, "A new method for post-acquistiion correction of spectral distortion due to a pulse pileup", pp. 712-718, see section III.

(Continued)

*Primary Examiner* — Marcus Taningco
(74) *Attorney, Agent, or Firm* — Blank Rome LLP

(57) ABSTRACT

A method is provided for processing a spectrum, obtained using a particle detection system, so as to reduce spectrum artifacts arising from unresolved particle events in the detection system. An input spectrum is obtained which contains artifacts due to "pile up" in the detector. A first effect upon the input spectrum of pairs of unresolved particle events is evaluated and a first corrected input spectrum is generated which comprises the input spectrum with the first effect removed. The effect of a pairs of unresolved particle events is then evaluated for this first corrected input spectrum so as to generate a second corrected input spectrum which comprises the input spectrum with the second effect removed. An output spectrum is then generated based upon a combination of the first and second corrected input spectra. The use of the method in improving sum spectra is also discussed.

13 Claims, 4 Drawing Sheets

(56) References Cited

U.S. PATENT DOCUMENTS

2008/0319714 A1* 12/2008 Camus .................. G01T 1/171
  702/189
2014/0328466 A1* 11/2014 Proksa .................... G06F 7/64
  378/62

OTHER PUBLICATIONS

Statham, Peter J., Pile-up Correction for Improved Accuracy and Speed of X-Ray Analysis; Microchimica Acta; An Int'l Journal on Micro & Traceanalysis, Springer-Verlag, VI, vol. 155, No. 1-2; Apr. 28, 2006; pp. 289-294.
Wielopolski, Lucian, et al., Prediction of the Pulse-height Spectral Distortion Caused by the Peak-Pile-up Effect; Nuclear Instruments & Methods; vol. 133, No. 2; Mar. 1, 1976; pp. 303-309.
Guo, Weijun, et al., The Monte Carlo Approach MCPUT for Correcting Pile-up Distorted Pulse-height Spectra; Nuclear Instruments & Methods in Physics Research, vol. 531, No. 3; Oct. 1, 2004; pp. 521-529.
Sjoland, K.A,; Time-resolved Pile-up Compensation in PIXE Analysis With List-mode Collected Data; Nuclear Instruments & Methods in Physics Research, vol. 150, No. 104; Apr. 2, 1999; pp. 70-75.
Langen, K.M., Pileup Correction of Microdosimietric Spectra; Nuclear Instruments & Methods in Physics Research, vol. 484, No. 1-3; May 21, 2002; pp. 595-612.

\* cited by examiner

METHOD OF PROCESSING A PARTICLE SPECTRUM

RELATED APPLICATIONS

This application is a national phase application of PCT/GB2014/051555, filed May 21, 2014, which claims priority to Great Britain Patent Application No. 1309417.2, filed May 24, 2013, the entire contents of which are incorporated herein by reference.

FIELD OF THE INVENTION

The present invention relates to a method of processing a particle spectrum, such as an energy dispersive x-ray spectrum.

BACKGROUND TO THE INVENTION

Energy dispersive x-ray (EDX) spectrometers use electronics to detect and measure the pulse arising from the arrival of a single photon in a detector and thus determine the energy of the photon and increment the corresponding energy "bin" in a histogram of counts representing the digitized energy spectrum. At high photon rates, it is possible for a second photon to arrive while the first is being measured and this gives an erroneous result due to "pulse pile-up". Most systems therefore include pile-up inspection circuitry to detect and veto such false measurements. The circuitry typically makes a correction by extending the acquisition time beyond the specified "live time" to compensate for the discarded measurements. The two contributing photons are effectively lost as if the acquisition period was "dead" for a short time, but rejecting such bad measurements will eliminate the false counts that would otherwise appear at the wrong energy in the spectrum. However, pile-up rejection circuitry is not perfect and if a photon of energy $E_2$ arrives within the "blind time" of the pile-up inspector following an earlier photon of energy $E_1$ then the resulting corrupted measurement will appear near the energy $E_1+E_2$. Thus, when two large peaks are visible in the x-ray spectrum, a spurious "sum peak" may also appear at the sum of the two peak energies. An early publication [P J Statham (1977), "Pile-up rejection: limitations and corrections for residual errors in energy dispersive spectrometers", X-Ray Spectrometry, 6, 94-103] suggests that, to first order, parent peaks at $E_1$ and $E_2$ give rise to a sum peak at $E_1+E_2$ with area given by the following equation:

$$A_{Sum} = A_1 \cdot A_2 \cdot (T_{12}+T_{21})/L \qquad (1)$$

Where L is the "live time" for the spectrum (the acquisition time corrected for electronic dead time periods), $A_{Sum}$ is the area in counts of the sum peak, $A_1$, $A_2$ are the areas of the parent peaks and $T_{12}$ is the minimum time for the pile-up rejection system to be able to resolve a photon of energy $E_1$ followed by a photon of energy $E_2$. It follows that $T_{21}$ relates to the minimum time for an $E_2$ energy photon to be resolved following an $E_1$ photon.

For accurate element identification, sum peaks have to be eliminated because energy sums can occur close to the energies of other element peaks and give rise to false designations. For example, C Kα+C Kα appears near O Kα; O Kα+O Kα appears near Na Kα, and Si Kα+Ca Kα appears near Cr Kα. When pile-up occurs, counts that should have appeared in an elemental peak now appear elsewhere in the spectrum so there are also pile-up losses that affect relative peak intensities and the accuracy of quantitative analysis. Besides sum peaks and counting losses, the spectrum shape may be distorted by "pile-up continuum". For example, near coincident arrival of characteristic photons with bremsstrahlung photons will produce an extension of the bremsstrahlung continuum above the Duanne-Hunt Limit (DHL) which would normally represent the highest possible x-ray energy in the spectrum. An additional complication is that when two pulses are not resolved, the magnitude of the measurement may be slightly less than $E_1+E_2$ because the time of arrival of the $E_2$ photon can be anywhere between 0 and $T_{12}$.

A procedure for correcting a spectrum for pile-up has been described previously [P. J. Statham (2006) Microchim. Acta 155, 289-294]. This extends the principle of equation (1) to cover individual channels in a digitized energy spectrum, rather than just peaks. Instead of using whole peak areas, equation (1) is evaluated at each channel, i, equivalent to a first photon $E_i$, for all possible second photons $E_j$ (recorded in channel j) to find what contribution will occur in energy channel i+j using the contents of the respective spectrum channels. $T(i,j)$ is the effective resolving time for a photon corresponding to energy i followed by energy j so that if $E_j$ arrives within this blind period, pile-up will occur and produce a sum event. The contribution from these sum events can then be subtracted from the original spectrum. As described in Statham (1977), the fraction of pulses in each channel that are "lost" by pile-up to higher spectrum energies can also be calculated and this should be performed before equation (1) is applied. A lost counts factor l(i) can be estimated as $\exp(\Sigma_k a[k] \cdot T(i,k)/L)$. Here, a(i) is the number of counts in channel i in the original spectrum, and al(i)=a(i)·l(i) is the counts after correction for pile up losses that more accurately reflects the incoming spectrum. Thus, in the overall correction, sum peaks and pile-up continua are removed and peaks are restored to compensate for pile-up losses. Application of equation (1) over all channels effectively produces a sum peak that has a width equal to the quadrature sum of the widths of the parent peaks contributing to the sum. However, the true width of the sum peak is the quadrature sum of the detector contributions at the two energies in quadrature with the electronic noise width. This slight overestimate of width can be corrected by a small resolution enhancement prior to calculation. As described by Statham (2006), the determination of the resolving time $T_{12}$ as a function of the two photon energies $E_1$, $E_2$ requires consideration of the detailed design of the pile-up inspector and the electronic noise in the system.

FIG. 4 in Statham (2006) shows a measurement channel (signal input) where the step height is proportional to photon energy. Measurement of the step height is performed by subtracting the average of the signal before and after the step. There are 3 pile-up inspection channels shown in FIG. 4, each with different time constants and therefore different noise contributions. The faster resolving time channel is noisier so it is not always easy to see the arrival of "steps". The slightly slower resolving "medium" channel cannot resolve steps so closely together, but has lower noise so it does see the arrival of the second step. Since this would be within the measurement period, the measurement is vetoed and does not appear in the spectrum. A correction is made to extend the acquisition time to compensate for the time that did not yield a measurement. Not all corrupted measurements will be detected and the average "blind period" $T_{12}$ following an event E1 where a second event E2 will not be recognized by the pile-up inspection system can be calculated from the design of the pile-up inspection system and the noise characteristics of the spectrometer.

An algorithm to perform this known process of pile up correction is as follows:

---
Algorithm 1: Prior art single pulse "pile-up correction"
---

1. Increase count magnitude in each spectrum channel a[i] to compensate for lost counts:
   al[i] = a[i] * l(i)
2. For each channel i
   For each channel j
      Add contribution al[i] * ( a[j] / L) * T(i,j) into channel sp[i+j]
3. Subtract sum event spectrum sp[i] from a[i] and increase magnitude of result to compensate for lost counts:
   corrected spectrum, ac[i] = (a[i] − sp[i]) * l(i)

---

It should be noted that the calculation of al[i] in step 1 is used to ensure a more accurate calculation of the "sum event" spectrum in step 2. Note also that a[j] is used in step 2, rather than the loss-corrected value al[i], because for single pile-up, the second photon must not be followed by a further photon within its "blind" period. This condition is basically the same as that required for a count to appear in a[i] rather than being pushed to a higher channel number by pile-up. In the third step the "sum event" spectrum (which essentially contains only sum event peaks) is subtracted from the original spectrum a[i]. Thus the first instance of considering lost counts in step (1) is to maximize the accuracy of the sum event spectrum in step (2), whereas the second instance of considering lost counts in step (3) is to most accurately reconstruct the "real" spectrum as was incident upon the detector. Furthermore, T(i,j) is an approximation to (1−exp(−NT·T(i·j)))/NT, where NT is the total spectrum count rate, that can be improved at some cost to computation time if desired.

An example of the use of Algorithm 1 is shown in FIGS. 1a, 1b and 1c for a spectrum from a sample of $Al_2O_3$ excited by a 20 keV electron beam. The uncorrected spectrum corresponding to a 20000 counts per second (cps) acquisition and having a full scale ordinate of 12123 counts, is shown in FIG. 1a, with an abscissa of kiloelectron Volts (keV). A 20 kcps acquisition rate is a modest count rate by state of the art standards. Spectral peaks for Aluminium and Oxygen are labelled in FIG. 1a. A scaled version of the spectrum is shown in FIG. 1b with an ordinate full scale of 573 counts. At this scale, the sum peaks for Al+O and Al+Al are visible and are also labelled in FIG. 1b. These energies are close to the energies for elemental P and Ag characteristic peaks and therefore, in a sample of unknown composition there is a risk that small concentrations of P or Ag could be identified erroneously. FIG. 1c shows the application of the pile-up correction Algorithm 1 which removes these sum peaks so that the corrected spectrum of FIG. 1c does not give rise to any false elemental identifications.

Although the method works well at low count rates, as the count rate is increased it is more likely that pile-up will occur with more than one pulse. That is, the probability increases that there is a pile up of three pulses. Extending the principle of the method of Algorithm 1, the magnitude of sum peaks involving unresolved pile-up of one pulse with two (not one) following pulses can be estimated with the approach shown in Algorithm 2 below:

---
Algorithm 2: A possible double pulse "pile-up correction"
---

1. Increase count magnitude in each spectrum channel a[i] to compensate for lost counts:
   al[i] = a[i] * l(i)
2. For each channel i
   For each channel j
      For each channel k
         Add al[i] * (al[j] / L) * T(i,j) * (a[k] / L) * T(j,k) into channel sp[i+j+k]

---

It should be noted that this is an extension of the method of Algorithm 1 and therefore the full correction in this case uses a consideration of single pulse pile-up as in Algorithm 1 in addition to double pulse pile-up as in Algorithm 2. However, in practice this causes a computational problem. If the spectrum consists of 1000 channels, then the nested loops required for the calculation in Algorithm 2 require a factor of 1000 times as many operations as the single pile-up calculation of Algorithm 1. Consequently, whereas correction for single pulse pile-up by the prior art approach can often be achieved in reasonable calculation times, correction for double pulse pile-up by a similar approach may be impractical. Indeed the users of such spectrum analysis apparatus are used to "real-time" correction of spectra, by which we mean that the calculations must be performed in less than 1 second.

One problem with Algorithm 1 is that pile-up losses and the contribution to sum events can only be calculated accurately if the input spectrum is known. Hence there is inherent inaccuracy because the measured spectrum is already subject to pile-up effects. As a result, the difference between the form of the acquired spectrum and the "true" spectrum becomes increasingly pronounced at higher count rates. As has been explained, pile-up losses occur in the spectrum when the photons involved in a pile-up event are not permitted to contribute to their true channel energy. The effect of pile-up losses can be compensated by a "boost" at the respective energy which is set out in step (1) of Algorithm 1. However, when sum peaks become significant, the procedure of Algorithm 1 cannot distinguish them from true elemental peaks and in practice this leads to "over-stripping" in the energy positions corresponding to double pile-up events. This effect is shown in FIGS. 2a and 2b where the spectrum input is essentially the same as for FIGS. 1a, 1b and 1c, but the intensity has been increased so that the count rate is high and is therefore high enough to produce much larger single pile-up sum peaks at Al+O and Al+Al. The uncorrected spectrum of FIG. 2a has a full scale ordinate of 10323 counts. Significant pile-up peaks of "Al+O" and "Al+Al" are illustrated. It is also possible to see smaller peaks at about 3.5 keV (corresponding to Al+Al+O) and about 4.5 keV (corresponding to (Al+Al+Al) which are caused by a double pile-up.

When the procedure of Algorithm 1 is applied, the large sum peaks (Al+O and Al+Al) are corrected quite well, however, over-stripping occurs at the energies corresponding to double pile-up, Al+Al+O and Al+Al+Al, because the calculation treats the Al+O and Al+Al sum peaks as if they were a real spectrum input. The effect of this over-stripping is noticeable as a reduction in local intensity for the respective energies, below the background level. So the over-stripping of pile-up sum contributions produces unrealistic "dips" or negative peaks in the spectrum, reduces the apparent continuum background level and causes errors in identifying element characteristic emission peaks.

A further problem for this single pile-up correction method arises when the beam is scanned over a grid of pixels to obtain a spectrum at each pixel, sometimes referred to as a "spectrum image". A typical spectrum image may contain data from a 256×256 grid with 65536 pixels and it is often too time-consuming to apply the software correction at every pixel. Furthermore, a single pixel spectrum may not contain many counts, particularly if resolutions higher than 256×256 are used, and therefore statistical fluctuations can give rise to poor precision in the results of Algorithm 1. It is standard practice to display a single spectrum which sums the spectrum content from all pixels of a spectrum image (often known as the "sum spectrum") and this aggregate spectrum is usually visually inspected, or processed by an algorithm, to find the peaks and determine what elements are present in the sample. If the pile-up correction of Algorithm 1 is applied to the sum spectrum, the results will be inaccurate if there is any variation in spectra across the field of view.

FIG. 3 shows a field of interest for a typical sample consisting of many different minerals. Thus, the spectral response is significantly different in different regions of this field of view. FIG. 4a shows that the sum spectrum for this field of pixels exhibits pile-up artifacts. FIG. 4b illustrates the effect of the pile-up correction Algorithm 1 on the spectrum of FIG. 4a. The upper curve represents the recorded spectrum whereas the lower curve shows the spectrum as corrected for pile-up. The pile-up correction is ineffective and produces anomalous results such as negative peaks or under-correction of sum peaks. For example in FIG. 4b a small sum peak is present at 8.2 keV but the correction algorithm overestimates this contribution and produces an unrealistic dip in the result spectrum at this energy. The inaccuracy is primarily due to the differences in spectral contributions from the various elements in different regions of the field of view from which the sum spectrum is created.

The key assumption for the prior art correction method of Algorithm 1 is that the measured spectrum can be used to predict the count rate for any x-ray energy and this count rate remains constant throughout the acquisition period. Clearly this does not apply when the spectrum is an aggregate of different spectra acquired from different regions. Furthermore the assumption does not apply if the count rates are so high that unresolved pile-up with two or more pulses becomes significant. There is therefore a need for an improved approach to spectrum correction for pile-up that addresses the problems exemplified by FIGS. 2a and 4b but does not involve a major increase in computational load.

SUMMARY OF THE INVENTION

In accordance with a first aspect of the invention we provide a method of processing a spectrum obtained using a particle detection system, so as to reduce spectrum artifacts arising from unresolved particle events in the particle detection system, the method comprising:
  a. Obtaining an input spectrum from the particle detection system, the input spectrum containing spectrum artifacts;
  b. Evaluating a first effect of pairs of particle events, which are unresolvable by the particle detection system, upon the input spectrum;
  c. Generating a first corrected input spectrum (ac1) comprising the input spectrum with the pairs of particle events according to the first effect removed;
  d. Evaluating a second effect of pairs of particle events, which are unresolvable by the particle detection system, upon the first corrected spectrum;
  e. Generating a second corrected input spectrum (ac2) comprising the input spectrum with the pairs of particle events according to the second effect removed; and,
  f. Generating an output spectrum (ac) based upon a combination of the first and second corrected spectra.

The invention provides an efficient method for processing a particle spectrum so as to remove problems originating from "pile-up" in the detection system used to obtain the spectrum. The method is particularly suited for use with a non-dispersive detection system that measures the energy of individual photons and is fitted with a "pile-up" inspection unit that disregards measurements that could be corrupted due to close arrival times of individual photons; however it has broader application to spectra of other particles and associated properties. The invention uses an evaluation of a first effect due to pile-up in an input spectrum, and achieves correction for a second effect due to pile-up by using a second evaluation, derived from the input spectrum as adjusted for the first effect. This allows an improvement in calculating the form of the actual spectrum as received by the detector (the output spectrum of the method).

Typically each of the first and second effects is a calculated effect of only pairs of particles (such as two photons) being received by the particle detector system during a time period in which the individual particles within a pair may not be resolved. The greater the count rate, the greater the probability that such pairs of events will occur.

Although in principle the spectra may be used without processing for "lost" counts, in practice a more accurate output spectrum is produced if one or preferably each of the first and second corrected spectra is corrected for lost counts. The correction may be represented as a mathematical function. Typically the correction is dependent upon the channel in question and the respective property magnitude (such as energy) of the particle pairs received. Note that the correction for lost counts provides a more accurate representation of the input spectrum and thus the count rates for each particle property that govern the probability of pile-up.

The first and second effects could be represented in a number of different ways, although for convenience of processing it is advantageous to represent these effects as a "sum event" spectrum. Such a spectrum may have a similar number of channels as the input or corrected spectra, although the magnitude of the counts for the channels is representative of the "pile-up" effect. Thus the structure represented is the "pile-up" structure, for example as single pile-up (two particle) or double pile-up (three particle) unresolved events. Such a sum effect spectrum may be calculated by a consideration of individual channels within a provided spectrum. For example, this may be represented by a relationship such as:

$$sa[p+q]=al[p]*a[q]*T(p,q)/L$$

where p and q denote first and second channel properties (such as energies) for respective particles (such as photons); $sa[p+q]$ is the additional contribution to the count value in channel $a[p+q]$; $al[p]$ is the loss-adjusted value of counts for channel $a[p]$; $a[q]$ is the number of counts in channel q; $T(p,q)$ is the resolving time for a p channel pulse followed by a q channel pulse; and L is the live time for the spectrum.

We have found that, to a good approximation, a mean average of the first and second corrected spectra provides an accurate output spectrum. However this is somewhat dependent upon the detection system electronics and therefore other combinations, such as a weighted combination, are also contemplated.

Pile-up events are statistically possible at any count rate. However, when the count rate exceeds a low value and becomes high, for example above 50000 counts per second then the present method becomes particularly beneficial as high count rates cause significant pile-up effects upon the detected spectrum and in particular more "double pile-up" events.

In principle the method may be used with any detection system which detects particles, and therefore detectors designed for any suitable particle energies or indeed other particle properties. For example it could in principle be used for a system detecting particles where the arrival of each particle produces a signal in the sensor that is proportional to some property of the particle such as energy, momentum, mass or velocity and where the spectrometer is designed to accumulate a histogram showing the number of particles with a certain value of that property. However, preferably the method is used in processing x-ray spectra. In such a case, typically the input spectrum comprises an x-ray spectral dataset. The dataset is represented as multiple channels (for example relating to the channels of the detection system), each channel corresponding to an energy range of an x-ray photon and each channel having an associated number of counts representing the number of x-ray photons having energies within the respective channel energy range. The data may therefore be thought of as being represented as histograms (of counts) with the channels representing a contiguous energy range.

In general, the first and second effects each calculate the effect of single pile up events upon the respective spectrum. Because of the use of a different spectrum for each calculation the output spectrum comprises the input spectrum as corrected for single pile-up and double-pile up events in the particle detection system.

As has been mentioned, a further benefit of the invention is in the processing of sum spectra. Thus, in accordance with a second aspect of the invention we provide a method of processing a spectrum to reduce spectrum artifacts arising from unresolved particle events in a particle detection system, wherein the spectrum is a sum spectrum comprising multiple spectra obtained from multiple locations upon a sample; the method comprising:
a. Assigning the multiple spectra into groups of spectra such that all spectra within a group have a similar distribution of counts as a function of a particle property;
b. Summing the spectra within each group to form a summed spectrum for each group;
c. Processing the summed spectrum of each group using a method according to the first aspect of the invention; and,
d. Forming an output sum spectrum by combining the output spectrum of each group.

As will be understood, each of the methods described above in association with the first and second aspects of the invention are preferably computer-implemented. Since the implementation of the invention avoids the need for substantially greater processor resources than known methods, it may be implemented upon similar computer system hardware as prior methods, including processors associated with commercial analytical systems. This allows the present invention to be implemented by virtue of a software upgrade to present systems.

BRIEF DESCRIPTION OF THE DRAWINGS

An example method is now described with reference to the accompanying drawings, in which.

DESCRIPTION OF EXAMPLE

Figure 1A:
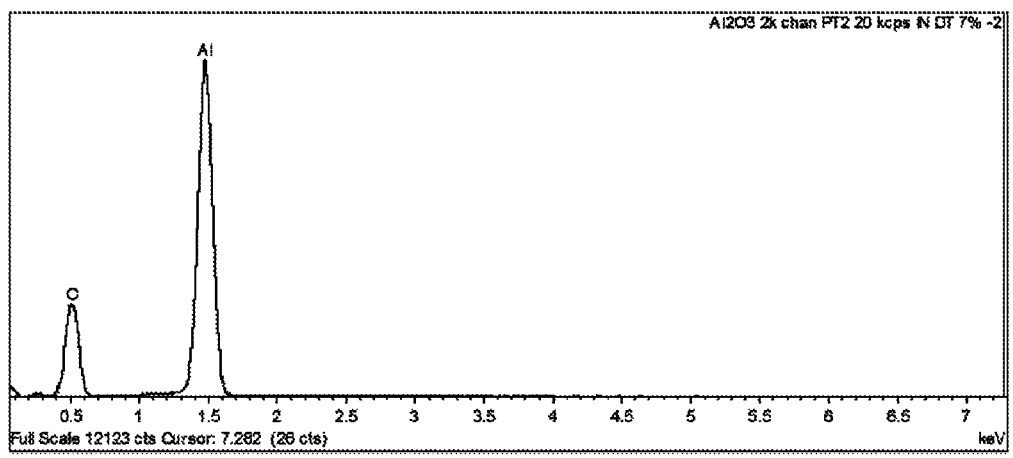
FIGS. 1a, 1b and 1c show respectively an uncorrected, uncorrected scaled and corrected spectrum illustrating a prior art pile-up correction method.

We now describe an example of the method in correcting for double "pile-up" events in an x-ray spectrum. An example of the use of the method for improving a sum spectrum is also discussed.

Firstly, in order to gain a full understanding of the inventive method it is necessary to understand why "overstripping" occurs with the prior art method.

In the calculation of Algorithm 1, for a detector "pulse" p followed by a pulse q (with these pulses representing the arrival of two photons of respective energies at the detector), the contribution to the "p+q" channel (that is a channel having an energy being the sum of pulse p and pulse q photons) is given by:

$$sa[p+q]=al[p]*a[q]*T(p,q)/L \qquad (2)$$

where sa[p+q] is the additional contribution to the count value in channel a[p+q]; al[p] is the loss-adjusted value of counts (ie. an increase) for channel a[p]; a[q] is the number of counts in channel q; T(p,q) is the resolving time for a p pulse followed by a q pulse; L is the live time for the spectrum (acquisition time corrected for electronic dead time periods).

The value of sa[p+q] is the estimated single pile-up contribution to the channel a[p+q] and this contribution is indistinguishable from real events.

Let us now consider the arrival of a further photon, represented by a pulse "r". As set out above, in the calculation according to Algorithm 1, the contribution due to "p+q" will be considered as if it were a real spectrum input (ie. a single photon having the combined energy of p and q). Such an input would pile-up with a subsequent single pulse r to give a contribution to a channel with higher energy a[p+q+r] given by:

$$sa[p+q+r]=sal[p+q]*a[r]*T(p+q,r)/L$$

where sal[p+q] is, the original contribution sa[p+q], boosted (that is, increased) by the factor l(p+q) to account for pile-up loss. Furthermore, referring back to Algorithm 1 notation, in the above equation "i" is "p+q" and "j" is "r". However, there is an additional calculated contribution in the reverse situation when i=r and j=p+q of $$al[r]*sa[p+q]*T(r,p+q)/L$$

Therefore, for events where pulse p is followed by a single q and then a single r, the Algorithm 1 will calculate the following contribution to channel p+q+r:

$$S1[pqr]=(al[p]*a[q]*T(p,q)/L)*l(p+q)*a[r]*T(p+q,r)/L+al[r]*al[p]*a[q]*T(p,q)/L*T(r,p+q)/L \quad (3)$$

This is for pulse order "pqr". A similar approach can be taken to predict the contribution for pulse order qpr, qrp, rqp, prq, rpq, all of which make a contribution to channel p+q+r.

As shown in the calculation of Algorithm 2 earlier, the number of events where a pulse p is followed by a single pulse q and then a single pulse r is given by:

$$ST[pqr]=al[p]*al[q]/L*T[p,q]*a[r]/L*T[q,r] \quad (4)$$

We have realized that, since $al[p] \cong a[p]$, $al[q] \cong a[q]$, $al[r] \cong a[r]$ and resolving times $T(*, *)$ are of the same order, the contribution S1(pqr) to the p+q+r sum calculated by the prior art algorithm is approximately twice the contribution ST(pqr) expected for such a pulse combination. Since a similar analysis applies for pulse ordering qpr, qrp, rqp, prq or rpq, the prior art method of Algorithm 1 will in general overestimate the total sum contribution to channel p+q+r by about a factor of two. Cancelling terms gives the ratio of calculated to expected contributions as:

$$S1[pqr]/ST[pqr]=(l(p+q)/l(q))*(T(p+q,r)/T(q,r))+(l(r)/l(q))*(T(r,p+q)/T(q,r)) \quad (5)$$

In a typical electronic system, the factors to account for pile-up losses l(p+q), l(q), l(r) and l(q) mainly depend on total spectrum count rate and energy, so the ratio in equation (5) is independent of the spectrum count distribution. Furthermore, in a system with a single pile-up inspection channel with fixed resolving time, the factor will be exactly 2.

Figure 1B:
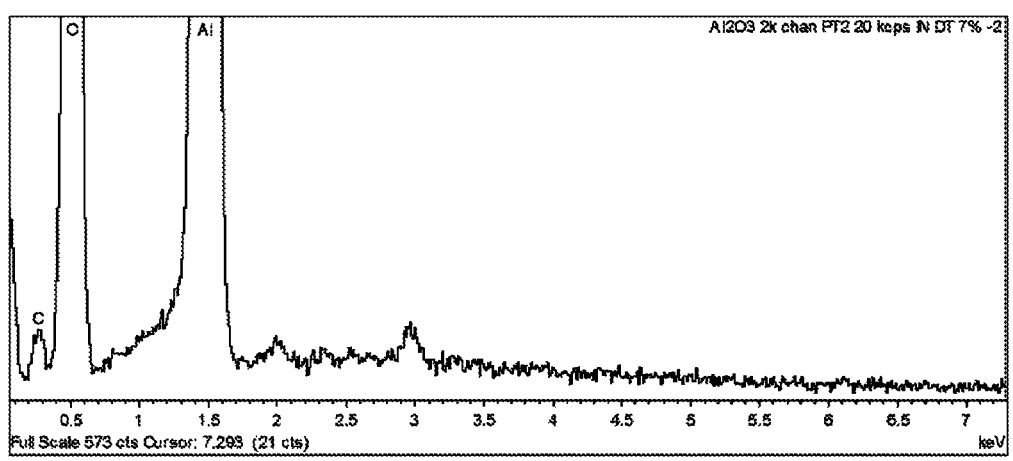
Figure 1C:
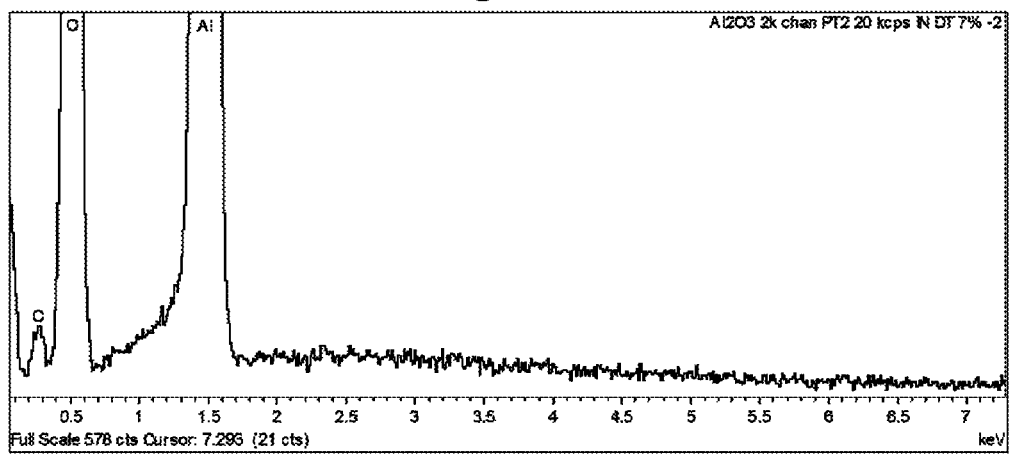

We have realized that this useful relationship can be exploited by isolating the contribution to "multiple" pile-up from the rest of the spectrum. The calculation within Algorithm 1 is effective in removing the single pile-up sum peaks such as Al+O and Al+Al in FIG. 1b at about 2 keV and 3 keV respectively. The double pile-up sum peaks are small compared with the single pile-up sum peaks and even with the "over-stripping" effect these remain small in a first pass through the algorithm. Therefore, if the algorithm is now repeated with the corrected spectrum now used as a better estimate of the input spectrum, the predicted pile-up sum spectrum sp[i] will no longer include any contributions of the type shown in equation (3) but will still include the accurate prediction of single pile-up peaks. Therefore, if this new sp[i] is subtracted from a[i], it will remove all single pile-up sum peaks but not strip anything away from multiple pile-up sum peaks.

Thus, using a second pass through the calculation a corrected spectrum is obtained which has no single pile-up sum peaks but retains the original double pile-up sum peaks. Halving the difference between the results from first and second passes reveals the contributions from multiple pile-up and this has been obtained without the expensive computation of the third loop over k of Algorithm 2. The average of the results of the two passes is a corrected spectrum with both single and double pile-up sum peak contributions removed.

Figure 2A:
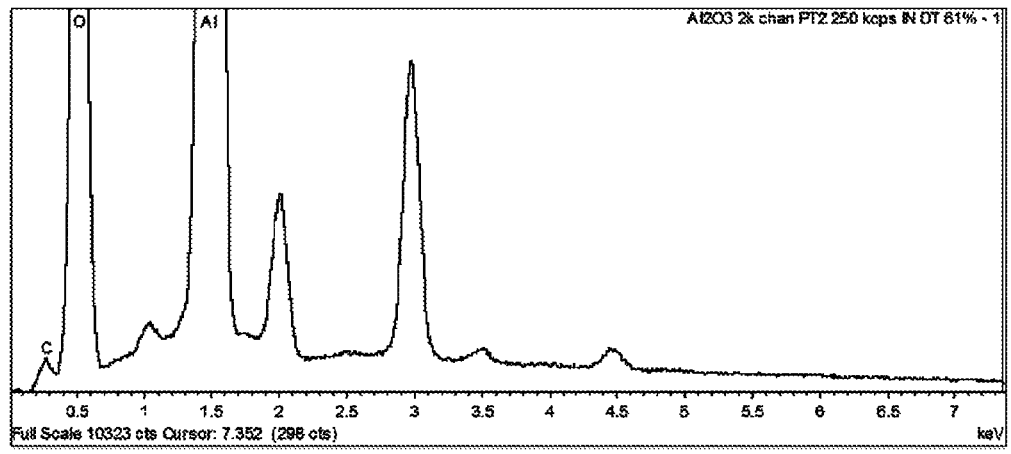
FIGS. 2a and 2b show an uncorrected scaled and corrected spectrum showing the "over stripping" effect when the pile-up correction of FIG. 1c is applied to a high count rate spectrum.
Figure 2B:
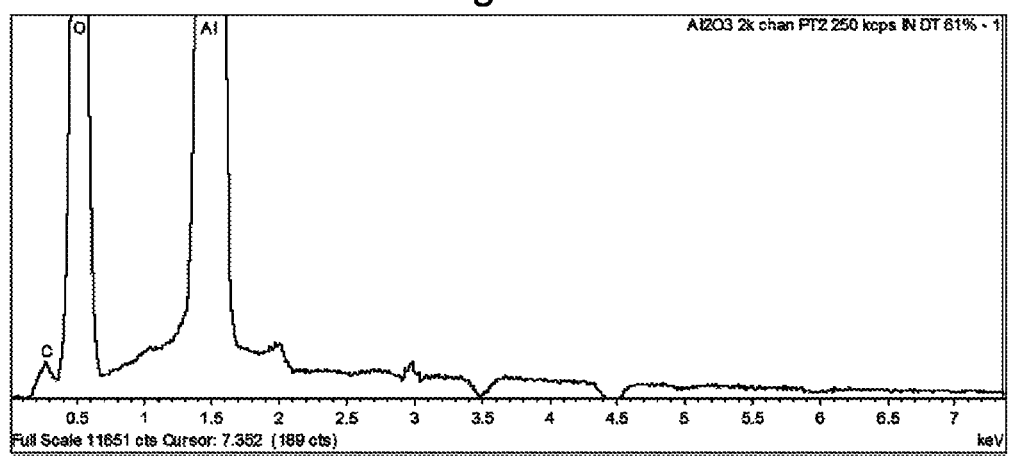
Figure 5:
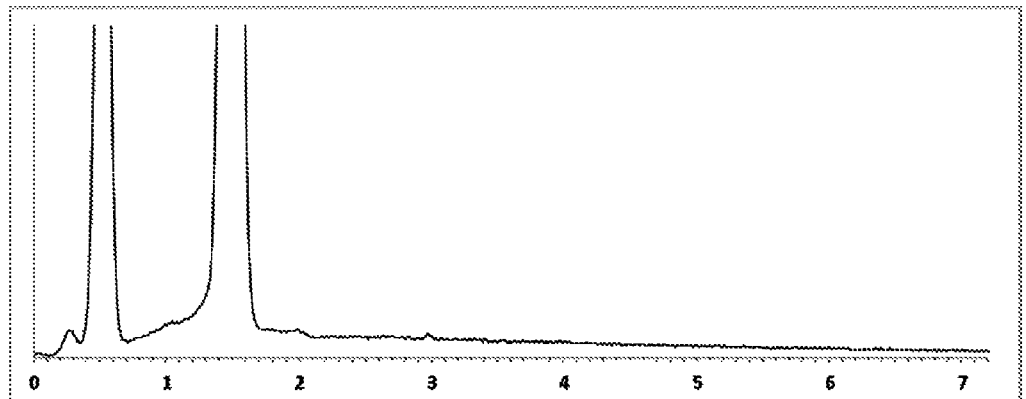
FIG. 5 shows the spectrum of FIG. 2a as processed according to a first example method of the invention.

The new procedure is summarized in Algorithm 3 and when it is applied to the same data as used for FIG. 2a, the result (shown in FIG. 5) is improved and shows no over-stripping of the double pile-up sum peaks (in comparison with FIG. 2b).

---

Algorithm 3: Improved pile-up correction

---

1. Increase count magnitude in each spectrum channel a[i] to compensate for lost counts:
   al[i] = a[i] * l[i]
2. For each channel i
       For each channel j
           Add contribution al[i] * a[j] * T(i,j) / L into channel sp[i+j]
3. Subtract pile-up event spectrum sp[i] from a[i] and increase count magnitude in the result to compensate for lost count to produce a first corrected spectrum:
   ac1[i]= (a[i] − sp[i] ) * l(i)
4. Starting with new zeroed array sp[i]
   For each channel i
       For each channel j
           Add contribution ac1[i] * ( ac1[j] / l(j) ) * T(i,j) / L into channel sp[i+j]
5. Subtract pile-up event spectrum sp[i] from a[i] and increase count magnitude of result to compensate for lost counts to produce a second corrected spectrum, ac2[i]= (a[i] − sp[i] ) * l(i)
6. Calculate final corrected spectrum ac[i] = (ac1(i) + ac2(i)) / 2

---

In the electronics used for this example, the factor of 2 is a satisfactory approximation for equation (5) but it is straightforward to alter the procedure for a different electronic system to use a slightly different factor, or even an energy-dependent factor.

In a typical system used for x-ray analysis, useful spectra can be acquired in a time of the order of one second and displayed on a monitor. Therefore any method used to correct spectra for artifacts needs to be completed in much less than one second to achieve an interactive display. The prior art method requires a preliminary pass to calculate the pile-up losses for factor l(i) so the computational cost is proportional to $2N^2$ where N is the number of spectrum channels. If the same approach were extended to deal with double pulse pile-up as in Algorithm 2, the computational cost would scale as $2N^2 \cdot (1+N/2)$ and with typical values of N>1000, computation times are likely to be orders of magnitude too high for this approach to be useful for interactive use.

The computational cost for the new method only scales as $3N^2$, that is, requiring only 50% additional computational cost. This method therefore achieves correction for both single and double pulse pile-up and can still be completed in much less than 100 ms with a typical instrumentation computer.

Figure 4A:
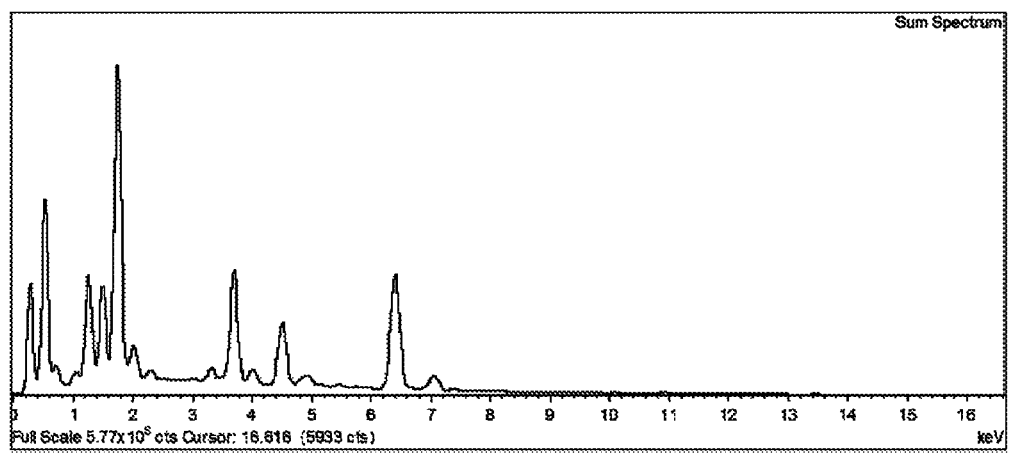
FIG. 4a shows a typical sum spectrum for the field of view illustrated in FIG. 3.
Figure 3:
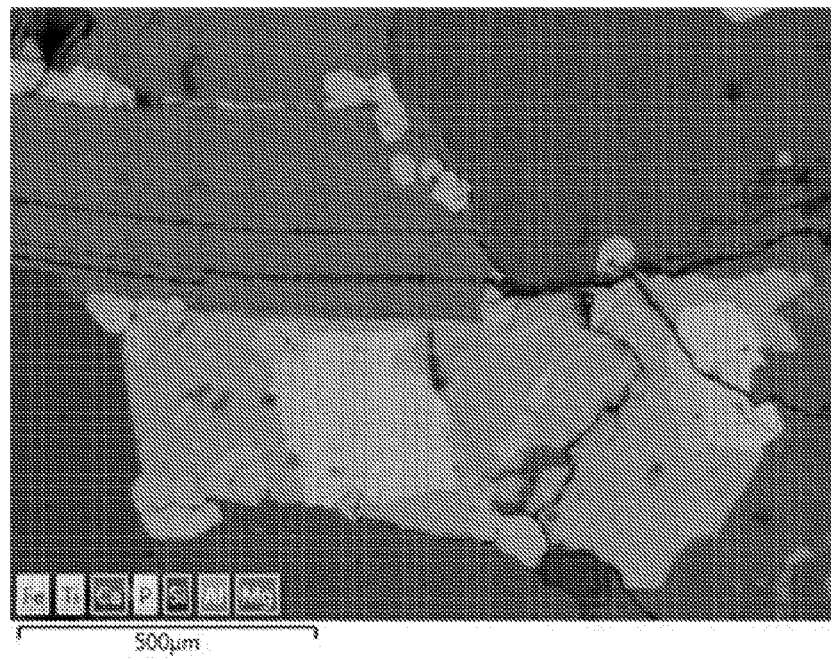
FIG. 3 is an example field of view for an example specimen with multiple phases showing distributions of different chemical elements.
Figure 4B:
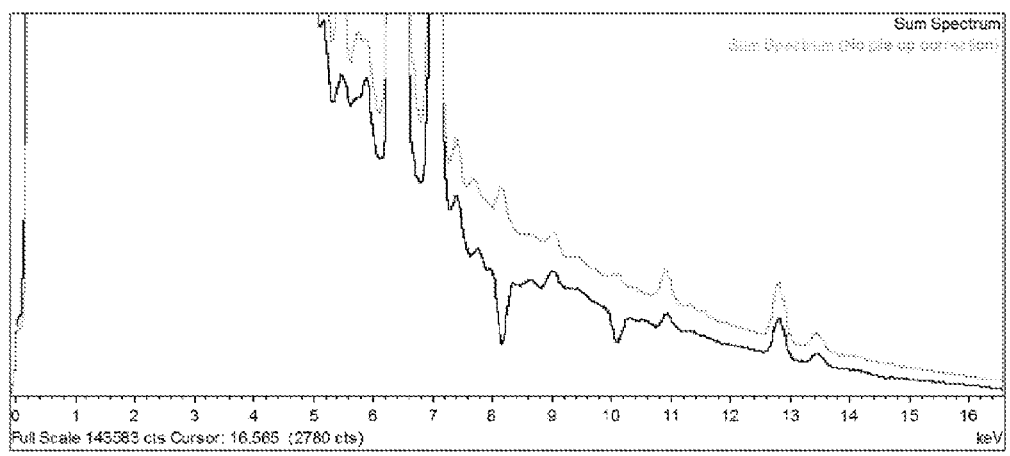
FIG. 4b shows how the prior art pile-up correction technique is not effective in correcting the spectrum.

The invention may also be used in situations where there is a requirement for spectrum imaging. In practical applications the sum spectrum may be used as the first indication of which elements are present in the whole field of view of a spectrum image. There is then a need to identify the elements present in order to build maps of those element distributions. However, the new correction method cannot be simply applied to the sum spectrum for all pixels if the pixel spectra are different. Even though the over-stripping of double pile-up peaks is addressed by the invention such as by the use of Algorithm 3, the statistical estimates of pile-up depend on the spectrum content being approximately constant throughout the acquisition period. A sum spectrum is equivalent to an acquisition where the spectral content is continually changing throughout the acquisition period and the new correction method is still liable to produce artifacts similar to those seen in FIG. 4b. This is somewhat unexpected consequence of using sum spectra and, if not addressed, places a limitation upon the practical applications of the new method, for example by limiting the analysis of sum spectra to regions of the image where it is known that there exists little variation in the elemental composition. This limitation may be removed by applying pile-up correction to each pixel in the spectrum image. However this requires a great deal of processing and destroys the "real time" capability of processing and displaying such spectra.

We have realized however, by using a clustering technique to aggregate pixels with similar spectral content into groups, spectra can be obtained from each group that are now appropriate for accurate correction for pile-up effects. This represents a novel use of such clustering techniques which, to date, have not been used in addressing pile-up artifacts. As an example, an adapted clustering algorithm (Oxford Instruments AZtec "AutoPhaseMap") has been applied to the spectrum image data that produced the sum spectrum used for FIGS. 4a and 4b. The algorithm identifies groups of pixels that have similar spectra. When spectra from pixels in each group are summed to form a single aggregate spectrum that spectrum is now appropriate for pile-up correction because it corresponds to an acquisition where the spectral content does not change during acquisition. The application of the method to sum spectra is summarized in Algorithm 4.

---

Algorithm 4: Application of pile-up correction to sum spectra

1. Cluster groups of pixels with similar spectra within a spectrum image dataset
2. For each group
    Sum pixel spectra and associated acquisition live time, L
    Correct group sum spectrum for pile-up using Algorithm 3
3. Sum all the corrected group spectra
4. Display the corrected sum spectrum that corresponds to the whole dataset

---

Figure 6:
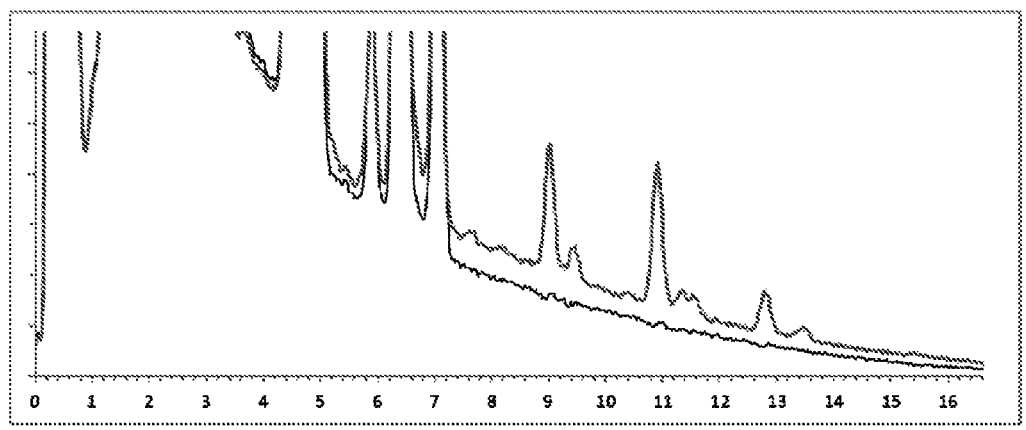
FIG. 6 shows a spectrum from one clustering group in a second example method applicable to correcting a sum spectrum by using multiple groups, each of similar spectra; and, FIG. 7 shows the corresponding pile-up corrected sum spectrum according to the second example.
Figure 7:
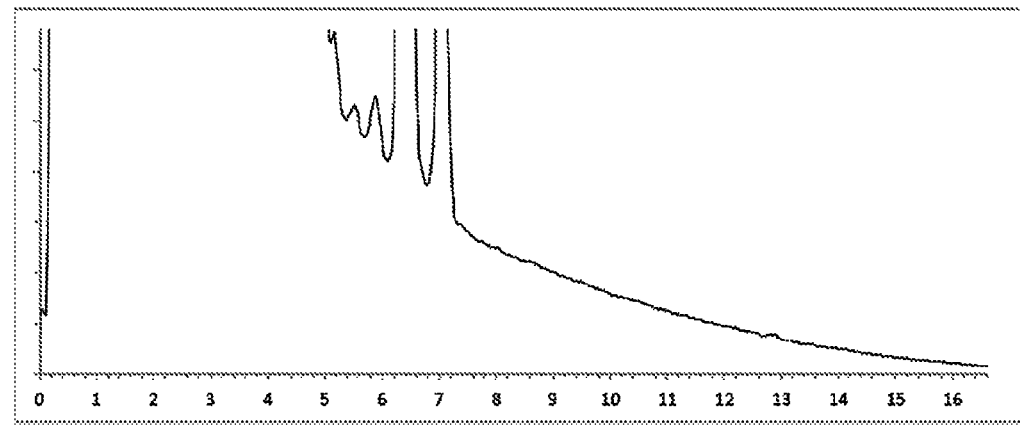

FIG. 6 shows a typical group spectrum where the strong pile-up artifacts have been eliminated by application of the new correction method, without any over-stripping elsewhere in the spectrum. Pile-up correction is now accurate because all pixel spectra are from similar material. The pile-up corrected spectra for all the different groups can now be summed together to give a sum spectrum that is now corrected for pile-up effects. The artifact-free sum spectrum can now be displayed and gives an accurate view of the average spectral content over the field of view so that the presence of elements can be identified from their characteristic peaks. This is illustrated in FIG. 7 which shows the new corrected sum spectrum formed by aggregating pile-up corrected spectra from all groups using the same data as for FIG. 4a.

The solution to the problem can be implemented practically by the use of a fast clustering algorithm that works on the spectral similarity between pixels and takes account of statistical variations from pixel to pixel. The use of clustering to produce a sum spectrum that is corrected for pile-up provides a practical and industrially applicable solution which enables real-time generation of corrected sum spectra which may be used in practice, for example, as a first step in identifying elements that are worth mapping for materials analysis purposes.

The invention claimed is:

1. A method of processing a spectrum obtained using a particle detection system, so as to reduce spectrum artefacts arising from unresolved particle events in the detection system, the method comprising:
    a. Obtaining an input spectrum from the particle detection system, the input spectrum containing spectrum artefacts;
    b. Evaluating a first estimate of pairs of particle events, which are unresolvable by the particle detection system, using the input spectrum;
    c. Generating a first corrected input spectrum (ac1) comprising the input spectrum with the pairs of particle events according to the first estimate removed;
    d. Evaluating a second estimate of pairs of particle events, which are unresolvable by the particle detection system, using the first corrected input spectrum;
    e. Generating a second corrected input spectrum (ac2) comprising the input spectrum with the pairs of particle events according to the second estimate removed; and,
    f. Generating an output spectrum (ac) based upon a combination of the first and second corrected spectra.

2. A method according to claim 1, wherein the each of the first and second estimates is a calculated effect of only pairs of particles being received by the detector system during a time period in which the individual particles within a pair may not be resolved.

3. A method according to claim 1, wherein one or each of the first and second corrected spectra is corrected for lost counts.

4. A method according to claim 1, wherein one or each of the first and second estimates is evaluated as a sum effect spectrum.

5. A method according to claim 4, wherein the one or each of the first or second estimates is calculated according to:

$$sa[p+q]=al[p]*a[q]*T(p,q)/L$$

where p and q denote first and second channel property magnitudes for respective particles; sa[p+q] is the additional contribution to the count value in channel a[p+q]; al[p] is the loss-adjusted value of counts for channel a[p]; a[q] is the number of counts in channel q; T(p,q) is the resolving time for a p channel pulse followed by a q channel pulse; and L is the live time for the spectrum.

6. A method according to claim 1, wherein in step (f) the combination is a mean average of the first and second corrected spectra.

7. A method according to claim 1, where in the spectrum is acquired at a count rate in excess of 50000 counts per second.

8. A method according to claim 1, wherein the input spectrum comprises an x-ray spectral dataset represented as multiple channels, each channel corresponding to an energy range of an x-ray photon and each channel having an associated number of counts representing the number of x-ray photons having an energy within the respective channel energy range.

9. A method according to claim 1, wherein the first and second estimates calculate the effect of single pile up events upon the spectrum and wherein the output spectrum comprises the input spectrum as corrected for single pile-up and double-pile up events in the detection system.

10. A method according to claim 9, wherein the data are represented as histograms and wherein the channels represent a contiguous particle property range.

11. A method of processing a spectrum to reduce spectrum artefacts arising from unresolved particle events in a particle detection system, wherein the spectrum is a sum spectrum comprising multiple spectra obtained from multiple locations upon a sample; the method comprising:
   a. Assigning the multiple spectra into groups of spectra such that all spectra within a group have a similar distribution of counts as a function of a particle property;
   b. Summing the spectra within each group to form a summed spectrum for each group;
   c. Processing the summed spectrum of each group using a method according to any of the preceding claims; and
   d. Forming an output sum spectrum by combining the output spectrum of each group.

12. A method according to claim 11, wherein the spectrum is a spectrum of a property selected from the group of: particle energy, particle momentum, particle mass or particle velocity energy.

13. A method according to claim 11, wherein the method is computer implemented.

* * * * *